(12) United States Patent
Candelore

(10) Patent No.: US 8,019,999 B2
(45) Date of Patent: Sep. 13, 2011

(54) WIRELESS RECEIVER DEVICE REVOCATION MANAGEMENT

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 889 days.

(21) Appl. No.: 12/069,048

(22) Filed: Feb. 7, 2008

(65) Prior Publication Data

US 2009/0103470 A1 Apr. 23, 2009

Related U.S. Application Data

(60) Provisional application No. 60/999,596, filed on Oct. 18, 2007.

(51) Int. Cl.
*H04L 9/32* (2006.01)
*H04L 29/06* (2006.01)
(52) U.S. Cl. .......................................... 713/175; 713/151
(58) Field of Classification Search .................. 713/151, 713/175
See application file for complete search history.

(56) References Cited

U.S. PATENT DOCUMENTS

| 7,242,766 B1 * | 7/2007 | Lyle ................................. 380/2 |
| 2007/0061875 A1 * | 3/2007 | Le Buhan et al. ............... 726/10 |
| 2008/0126561 A1 * | 5/2008 | Ryu et al. ....................... 709/234 |
| 2008/0196086 A1 * | 8/2008 | Shintani et al. .................... 726/4 |
| 2009/0260043 A1 * | 10/2009 | Tatsuta et al. .................... 725/81 |

FOREIGN PATENT DOCUMENTS

WO WO 2007/037379 A1 * 5/2007

OTHER PUBLICATIONS

R. Housley et al. RFC 2459: Internet X.509 Public Key Infrastructure Certificate and CRL Profile. Jan. 1999. p. 1-121.*

* cited by examiner

*Primary Examiner* — Christian Laforgia
(74) *Attorney, Agent, or Firm* — Miller Patents Services; Jerry A. Miller

(57) ABSTRACT

A method of carrying out wireless video communication involves at a wireless receiver (WR) device, providing a digital certificate, the digital certificate containing a High-Bandwidth Digital Copy Protection (HDCP) Key Source Vector (KSV), a device identifier for the WR device, and a digital signature cryptographically binding the identifiers; at the WR, responsive to an initiation of a wireless communication session from a wireless transmitter (WT) device, sending the digital certificate to the WT device; the WT receiving the digital certificate and having the identities in the digital certificate checked against a revocation list; and if one of the WR device's identities has been revoked, halting the wireless communication session. This abstract is not to be considered limiting, since other embodiments may deviate from the features described in this abstract.

13 Claims, 7 Drawing Sheets

WIRELESS RECEIVER DEVICE REVOCATION MANAGEMENT

CROSS REFERENCE TO RELATED DOCUMENTS

This application is related to and claims priority benefit of U.S. Provisional Application No. 60/999,596 filed Oct. 18, 2007, which is hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

High Definition Multimedia Interface (HDMI) connections have become the standard in interconnection of high definition audio visual equipment. The interface has been well received, relatively problem free and accepted by consumers. However, as with all wired interconnections, the wiring itself often makes for troublesome or unsightly interconnection regardless of the interface.

In HDMI interfaces, High-Bandwidth Digital Copy Protection (HDCP) is used to assure the protection of secure content from copying by unauthorized equipment. In the analog world, each generation of copying introduces a small amount of content degradation, leading to a somewhat self limiting problem with multi-generational copying. However, in the digital environment, each copy is essentially a perfect copy of the original, leading to increased dependence upon copy protection and copy management for secure content to avoid compromise of the content and subsequent unauthorized use. HDCP provides such protection of the content between authorized devices using HDMI.

Several manufacturers are now attempting to address the inconvenience of hard wiring in the HDMI environment by use of wireless transmission of the content received from an HDMI/HDCP source or host device to a recipient "sink" device such as a television that might be more conveniently located in place that is not conducive to hard wiring. However, conversion of the content to wireless introduces security vulnerabilities that heretofore have not been adequately addressed or in many instances even recognized. These vulnerabilities can create a security breech. There are at least 4 scenarios to analyze: 1) standalone wireless repeater transmitter and standalone wireless repeater receiver, 2) standalone wireless repeater transmitter and embedded wireless repeater receiver, 3) embedded wireless repeater transmitter and standalone wireless repeater receiver, and 4) embedded wireless repeater transmitter and embedded wireless repeater receiver.

Initially, manufacturers are planning to target scenario #1 above which will work with existing HDMI/HDCP devices. Later as the wireless schemes become adopted they will be built-in to the devices and therefore Scenarios #2 and #3 will become important. Later, they will be built-in to all devices, and Scenario #4 will be important. Even though both content sources and display devices may have wireless capability built-in, they may need to accommodate devices that won't have it built-in as well.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
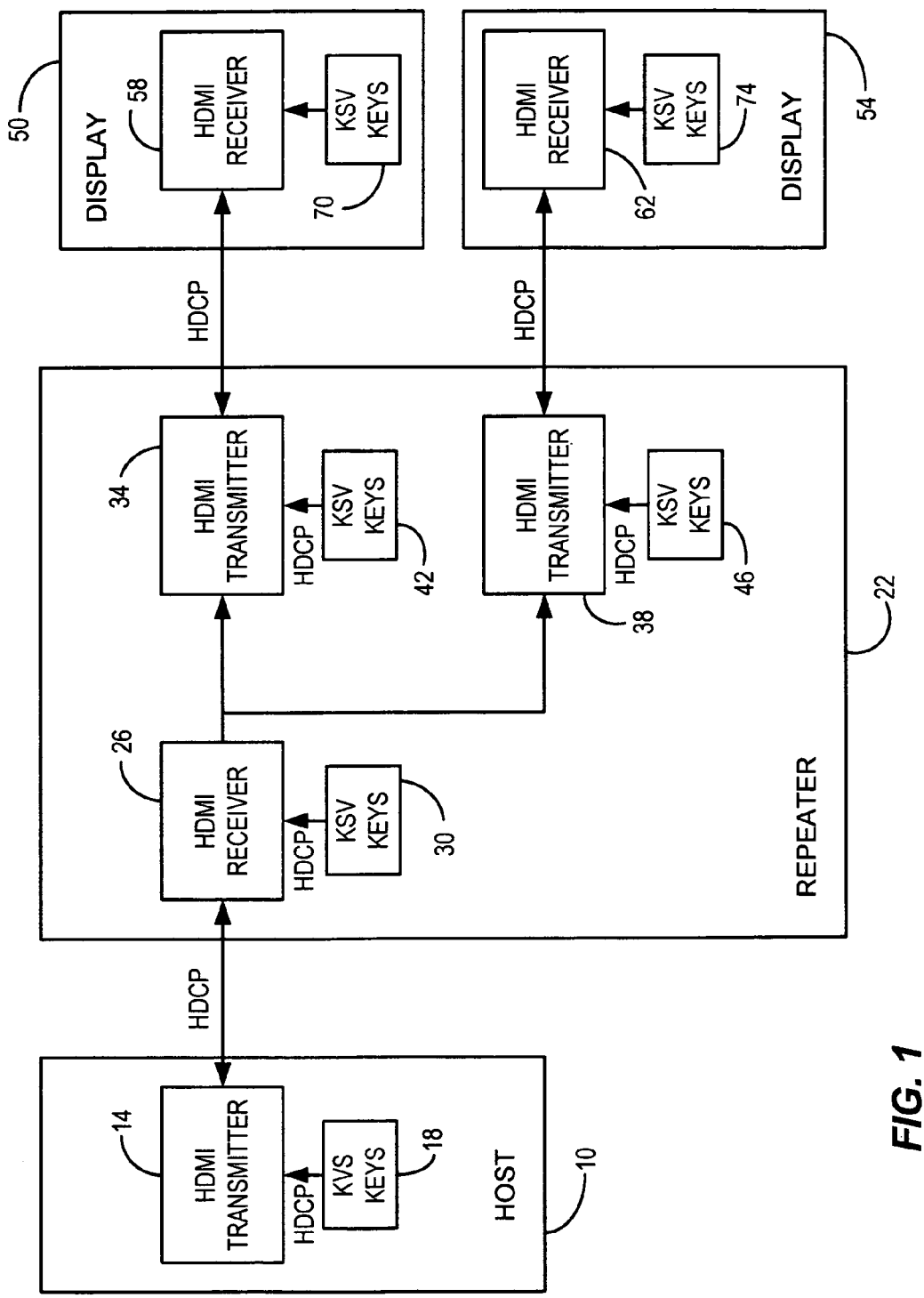
FIG. 1 is an illustrative HDMI repeater.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "processor", "controller", "CPU", "Computer" and the like as used herein encompasses both hard programmed, special purpose, general purpose and programmable devices and may encompass a plurality of such devices or a single device in either a distributed or centralized configuration without limitation.

In the discussion below, HDMI is used as the proposed digital interface. However, the Digital Video Interface (DVI) could be used equally as well. DVI is a legacy interface that did not cover audio. New audio visual products use HDMI. Both HDMI and DVI use HDCP to protect content across the link from the source to the sync device. While the illustrative examples below utilize HDMI, HDCP and AES, other embodiments may equally well use other technologies.

Turning now to FIG. 1, it is useful to review how a wire-based HDCP repeater operates, since wireless repeaters are likely to be based upon this technology and must work with legacy devices having HDMI interfaces. In this example, the HDMI host 10 (e.g., a television set top box (STB) or other source of content) has a transmitter 14 that transmits content encrypted using HDCP keys 18 to a receiver device. In our scenario, the receiver device is a repeater. The HDMI host 10 transmits using HDCP protocol to the HDMI repeater 22 where the content is received by HDMI receiver 26 that decrypts the content using keys 30. Note that HDMI requires two way communications using I2C, so the terms transmitter and receiver as used herein are used loosely to define the direction of flow of the content and not in the strictest sense. Thus a receiver also includes an I2C transmitter and vice versa.

HDMI receiver 26 passes the content along to one or more HDMI transmitters 34 and 38 for retransmission using encryption under KSV (Key Source Vector) keys 42 and 46 respectively. The transmissions are directed in this example to displays 50 and 54 via HDCP protected HDMI connections and are received by HDMI receivers 58 and 62 respectively that decrypt the content for display using KSV keys 70 and 74 respectively. A major assumption with "standard" HDCP is that the repeater HDMI transmitters 34 and 38 are "known" to the repeater HDMI receiver 26 since they are part of the same device. As described in more detail below, if the HDMI receiver is not revoked, and check value sent by the HDMI transmitter 14 verifies, then HDMI receiver 26 checks out and it will not lie about the identities of the HDMI transmitters. The HDMI transmitters must be secure too. The repeater transmitters 34 and 38 will verify the identity of the corresponding HDMI receivers 58 and 62 and report those through the HDMI receiver back to the host 10. All the HDMI transmitters and receivers are therefore considered secure by the source device, host 10, and copy protected content can be played out from the host. However, in the case of a wireless repeater, this assumption may be incorrect leading to a potential for a security breech.

Now delving into a more details, in a correctly functioning environment, the source HDMI transmitter 14 verifies the repeater HDMI receiver 26 by sending an encrypted random number to the receiver 26. Receiver 26 then decrypts the random number and sends it back to the transmitter 14 in order to verify that the receiver is valid. Once verified, the transmitter 14 knows that a valid repeater receiver, having the HDCP private keys associated with a particular KSV, is connected. The repeater HDMI transmitters 34 and 38 use a similar technique to verify the display HDMI receivers 58 and 62. Once the HDMI transmitters verify that valid display receivers 58 and 62 are connected, the identities of the display receivers are reported to the host 10 through the I2C connection of HDMI receiver 26. The repeater 22 knows the KSVs (Key Source Vector—essentially an identifier) 42 and 46 of both of the repeater HDMI transmitters as these are built into the same device 22. These KSVs 42 and 46 are also reported to host 10. The content source, host 10, is then able to check the repeater receiver 26, repeater transmitters 34 and 38 and the display receivers 58 and 62 against a revocation list. Assuming none of the devices have been revoked, normal communication can be carried out—protected content can be played out. The coexistence of HDMI receiver 26 in the same device as HDMI transmitters 34 and 38 provides a measure of implicit trust between those devices in order to assure security of the system against compromise of the secured content. Because of its inherent split nature, the wireless repeater lacks this implicit trust, and this leads to the potential security breech.

Figure 2:
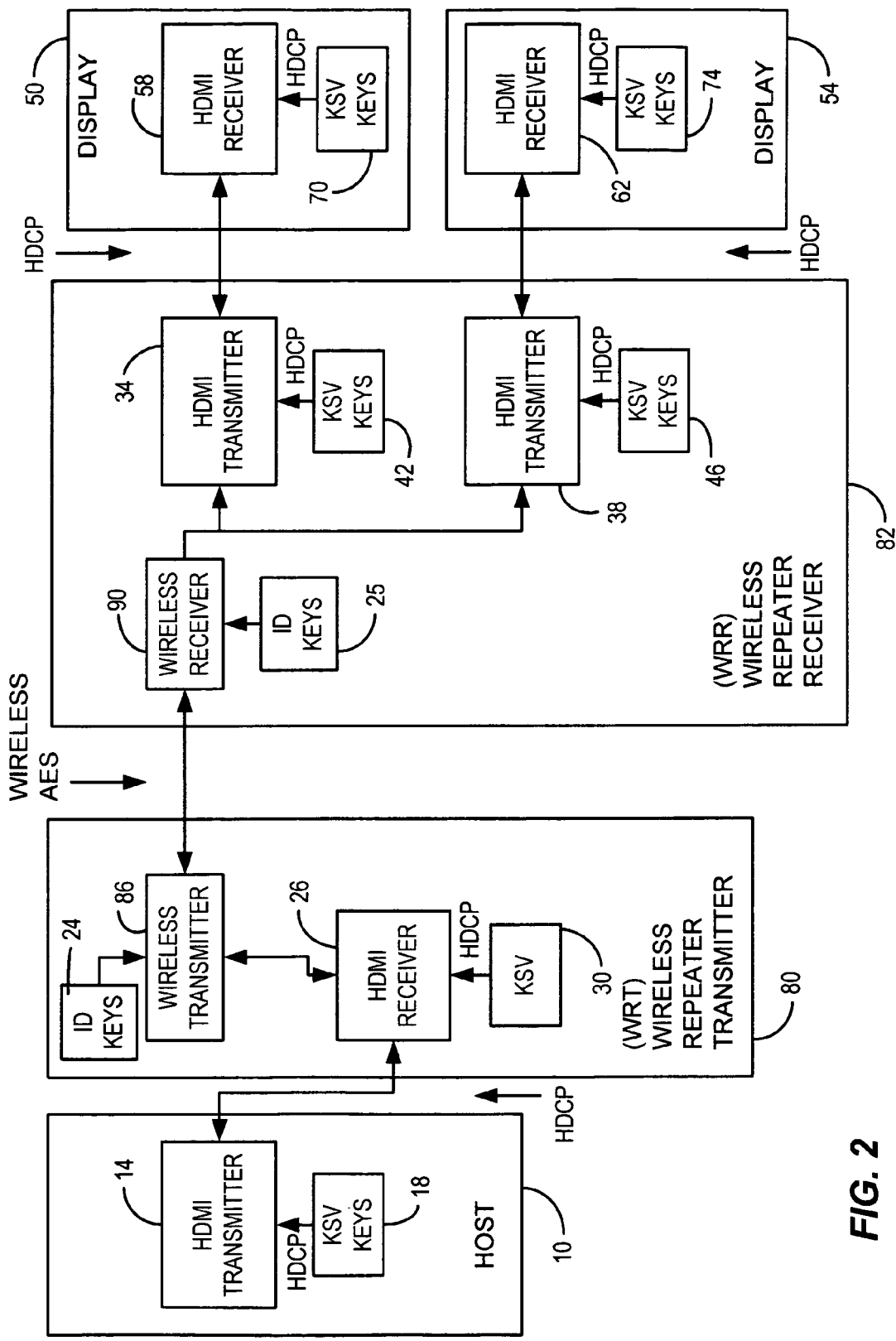
FIG. 2 is an illustrative wireless repeater device.

Let's consider the wireless repeater devices 80 and 82 of FIG. 2. In this scenario, the repeater is essentially the same as a wired repeater except that there is no direct internal connection between HDMI receiver 26 and HDMI transmitters 34 and 38. A wireless transmitter and wireless receiver pair 86 and 90 are juxtaposed between the HDMI receiver 26 and HDMI transmitters 34 and 38 and have their own separate identities 24 and 25 respectively, defined, for example, by a serial number ID and cryptography keys. The wireless repeater transmitter (WRT) 80 and wireless repeater receiver (WRR) 82 each have at least two identities—one from the wireless transmitter or wireless receiver, and one from the HDMI transmitter or HDMI receiver. Both the WRT 80 and the WRR 82 must work with legacy HDMI-enabled devices which know nothing about the separate wireless identities 24 and 25. Ideally, any WRT 80 should work with any WRR 82 to facilitate its versatility and reparability. Hence, in the scenario shown in FIG. 2, there is no implicit trust between the repeater HDMI receiver 26 and the repeater HDMI transmitters 34 and 38 since they no longer form a part of the same device.

Since the HDMI receiver 26 and HDMI transmitters 34 and 38 are no longer a part of the same enclosed system, there is potential for vulnerability of the system by spoofing or faking a wireless repeater receiver (WRR) 82. Because the WRT 80 and the WRR 82 must work with the existing HDCP protocol, their wireless identities 24 and 25 cannot be revoked using those protocols. WRT 80 and WRR 82 are intended to add wireless capability to existing wired devices. But the main security issue is with wireless identity 25 since wireless identity 24 in the wireless repeater transmitter can be indirectly revoked using the HDCP identity 30. Indirect revocation is possible since wireless identity 24 is built into the same device as HDCP identity 30. Since HDCP identity 30 can be checked, wireless identity 24 is not a security issue. As will be shown below describing various embodiments consistent with the invention, the existing HDCP mechanism used for revoking HDCP devices can be used to revoke compromised a wireless identity 25 used with WRR 82.

A method is provided for linking the wireless receiver identity 25 with that of HDCP identities 42 (and/or 46 if there is a dual HDMI output). This method causes the KSVs from 42 and/or 46 to be correctly reported back to the content source, host 10, so that they may be checked against a revocation list. It should be noted that while FIG. 2 shows two HDMI transmitters 34 and 38 for easy comparison with FIG. 1, the discussion below is equally valid if only one HDMI transmitter were used or if greater than two are used. In certain embodiments, only one of the HDCP identities can be used to validate the repeater, but in others, both or all can be used as part of the certificate described later.

In proposed wireless repeater devices, the wireless link is encrypted using the Advanced Encryption Standard (AES). A session key is delivered involving keys 24 and 25 of WRT 80 and WRR 82 respectively. The keys 24 and 25 may entail symmetric or public/private keys. In some implementations, keys 24 may not exist and keys 25 are the primary keys. A hacker may be able to create a fake WRR by reverse engineering a real WRR 82 and then mass producing clones. In some of the proposed implementations, identity and keys 25 are not authenticated, e.g. using a certificate signed by trusted certificate authority. In which case, wireless WRR keys and identity 25 might be synthesized outright by a hacker. Alternatively, again depending on the proposed security implementation, it may be possible to observe the communication between the WRT 80 and the WRR 82 so that a hacker may be able to cryptographically attack and thereby gain knowledge of the keys 25. In any of the above scenarios, once a WRR identity and keys 25 are known or created (synthesized), a spoof receiver may be created that can then be used to improperly output content without copy protection, e.g. to an HDMI interface with HDCP permanently turned-off. A good security system should anticipate this possibility, and provide a means to shut-off the spoof receiver. HDCP employs a revocation list. The spoof receiver, described above, will report KSVs, 42 and 46, associated with the HDMI transmitters 34 and 38. But these are not implicitly trusted as in the simple HDCP repeater case, and they are unverified in that the associate keys are not used with a random check value to show that they are real. Consequently, any KSV values, 42 and 46, can be reported back to the wireless repeater transmitter (WRT). In turn, the WRT will report those fake KSVs to the host 10. Revocation by the host 10 therefore will be impossible.

Figure 4:
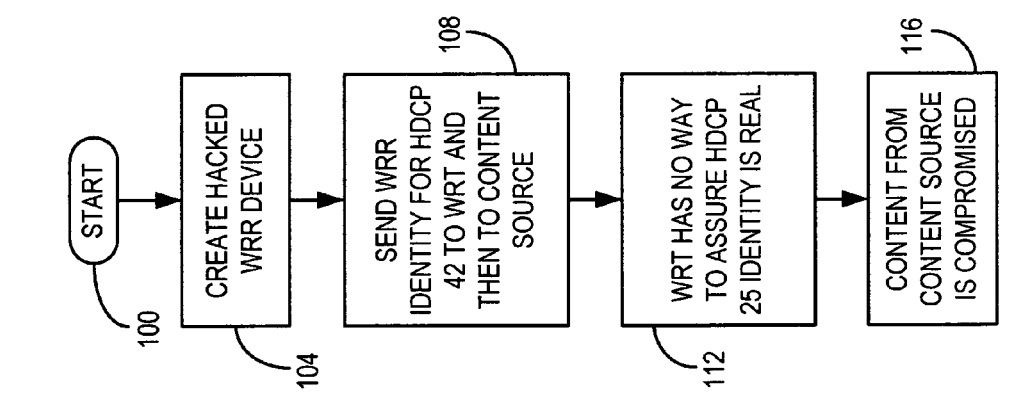
FIG. 4 is a flow chart broadly depicting a hacking process that could be used to spoof the wireless repeater of FIG. 2.
Figure 3:
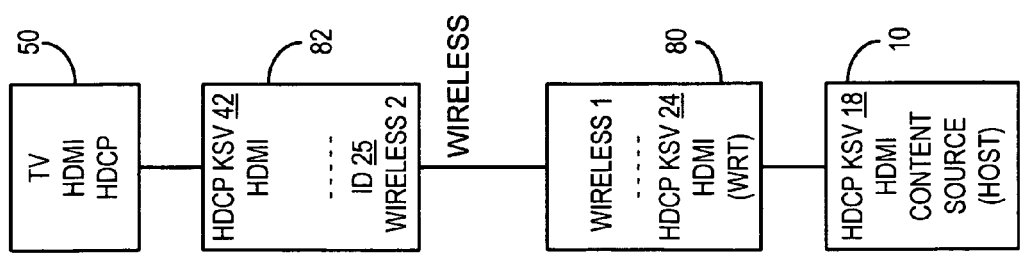
FIG. 3 is another representation of the wireless repeater.

Now consider FIG. 3, which depicts one link to TV 50, using the signal chain described in connection with FIG. 2. In this example, device 10 is the content source, device 80 is considered a wireless repeater transmitter (WRT), device 82 is considered a wireless repeater receiver (WRR) and device 50 is considered the display. This chain of devices can be hacked using the following scenario as is broadly outlined in FIG. 4 starting at 100.

As described above, by any number of different means, a hacker might be able to fake a wireless repeater receiver (WRR) device 82 so that clear content can be copied at the HDMI interface. The hacker may use a real, or depending on the proposed security implementation, a completely made-up or fake identity 25 for the WRR 82 at 104. At 108, the real or fake wireless identity 25 and fake HDCP identity 42 of WWR 82 is sent to the WRT 80 and ultimately to the content host 10 at 108. Since, at present, the WRT 80 has no way at 112 to assure the integrity of WRR 82's HDCP identity 42, the KSV. It carries out normal communication thereby rendering the content compromised at 116. The HDCP identity 42, the KSV, of the WRR 82 should be revoked by the content source host 10, but the hacked WRR 82 can send a fake HDCP identity 42 to WRT 80 instead. That faked HDCP identity will then be reported to the content source, host 10. No revocation will be possible and thus the security of the content is compromised.

One proposal to avoid this problem is to mate a WRT 80 and a WRR 82 forming a wireless repeater pair at the factory. For example, a WRT 80 could be programmed to only listen to a specific WRR 82 wireless identity 25 with certain unique keys. In such a scenario, a factory database is created which ties WRT 80 and WRR 82 together as well as the associated HDCP KSV and keys 42 and 46. To perform a hack, a pair of devices would need to be compromised. The WRT 80 must report a valid and verified KSV to the host 10 if content is to be sent to it by host 10. If a wireless repeater pair was hacked, the HDCP KSV 24 and 42 (and 46 if there is a dual HDMI output) would appear on the revocation list. While mating does solve the security problem, it presents problems of its own. Such a factory pairing has a number of drawbacks including the inability to replace only one part of a defective repeater and the ability to receive the wireless transmission from a different source device 10 connected to a different WRT 80. Mating would also inhibit or prevent a consumer from later upgrading the transmitter to one with a greater range. Also, in the case of the wireless receiver WRR 82 embedded in the display 50 (see FIGS. 6 and 8), mating would create operational problems as the factory lines are often in different physical locations, and replacement of multiple components which are paired could create a high service cost and limit versatility. Factory mating also precludes a "many-to-one" scenario, where a consumer operating a WR may pick from various WT devices spread across the home.

Figure 5:
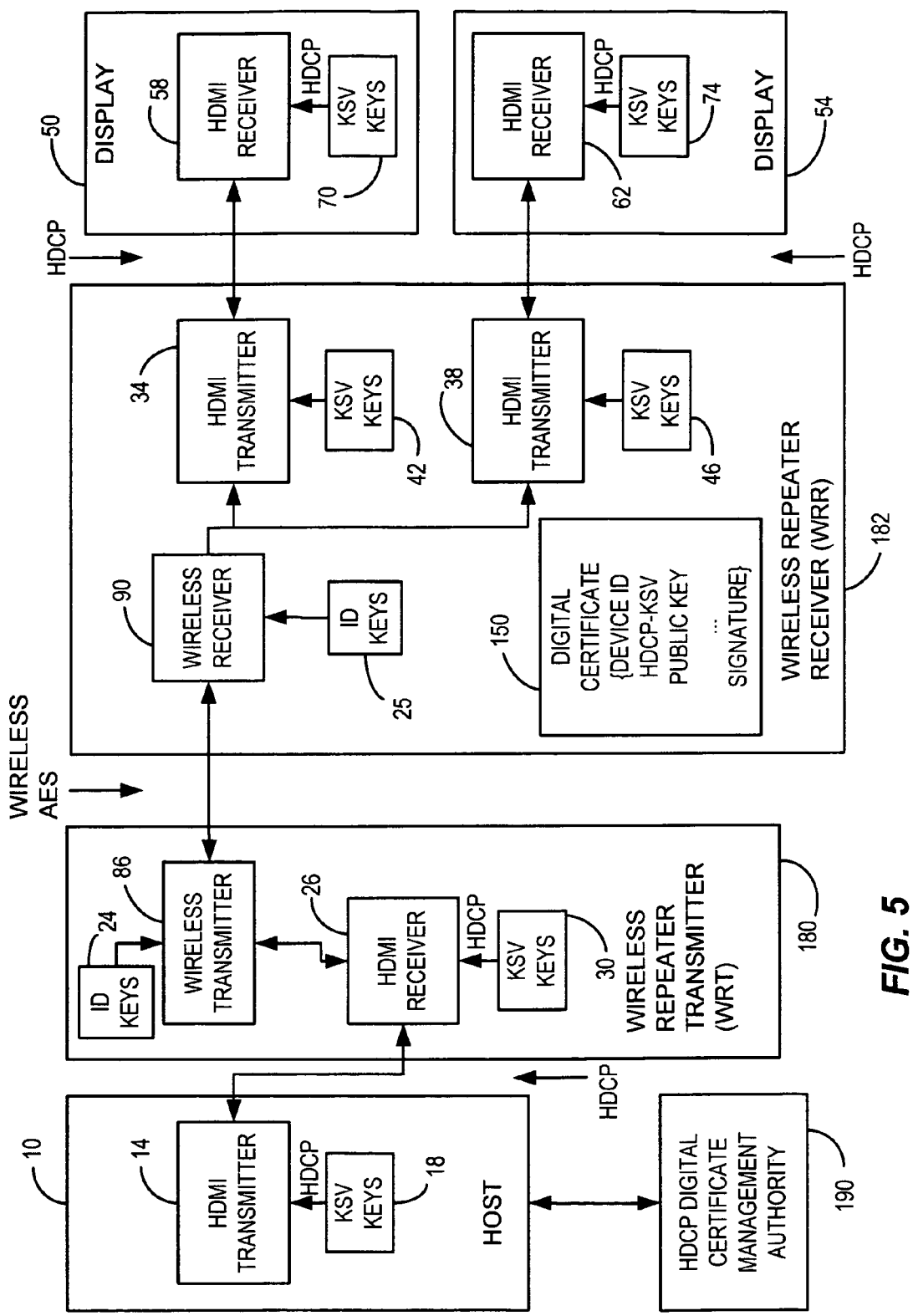
FIG. 5 is an exemplary wireless repeater transmitter and receiver consistent with certain embodiments of the present invention.
Figure 6:
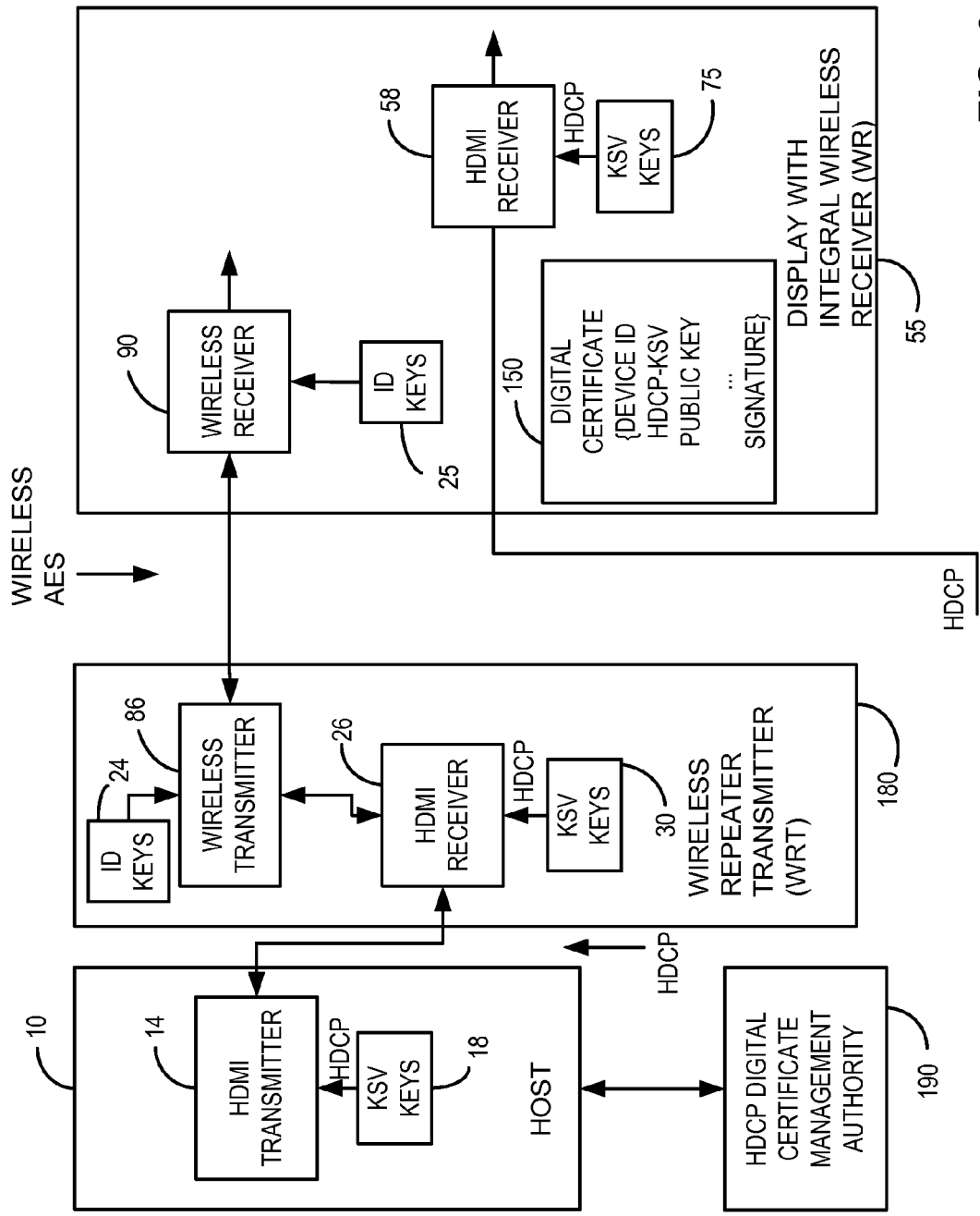
FIG. 6 is an exemplary wireless repeater transmitter with the receiver integrated in the display consistent with certain embodiments of the present invention.
Figure 7:
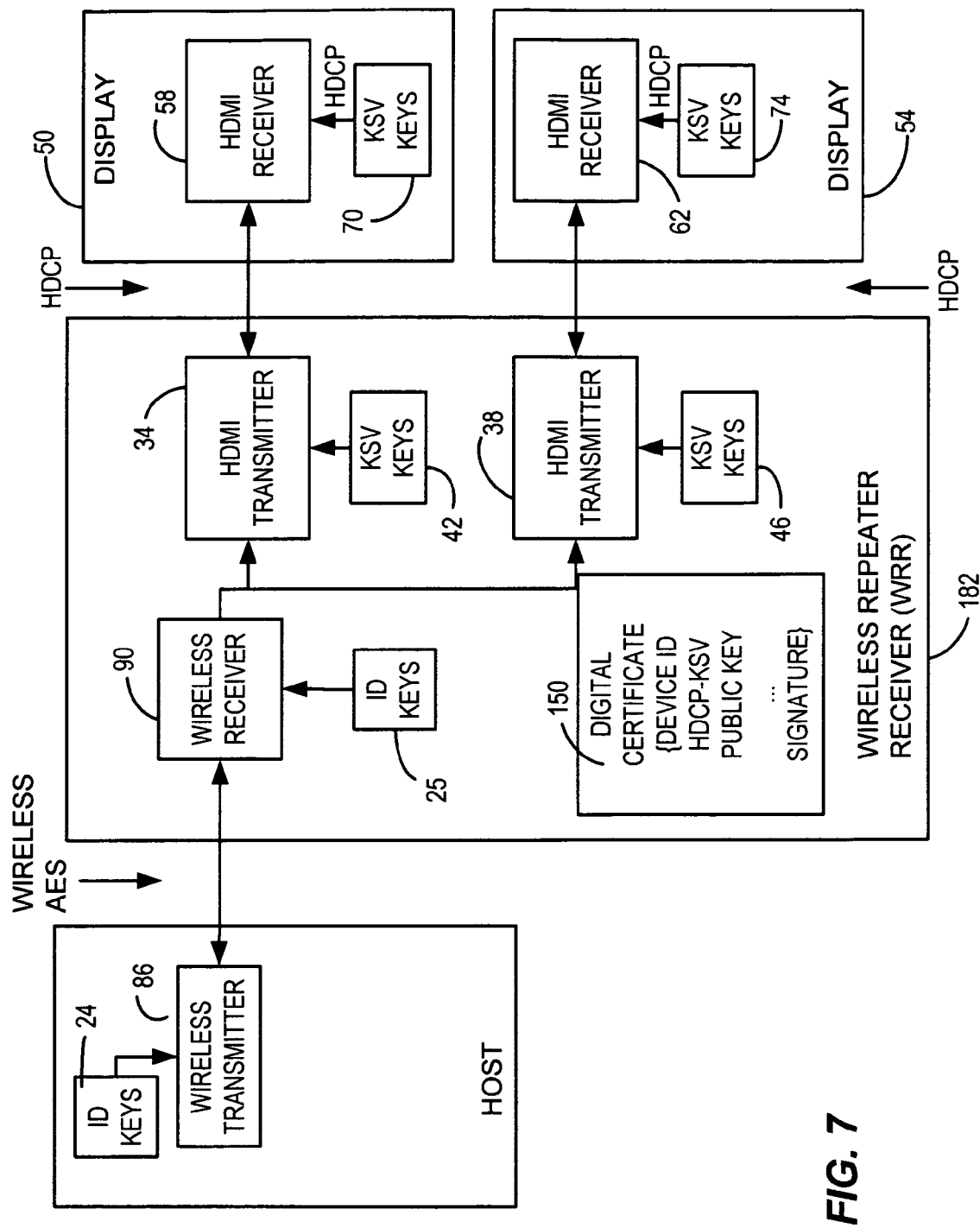
FIG. 7 is an exemplary integrated wireless repeater transmitter and a standalone receiver consistent with certain embodiments of the present invention.
Figure 8:
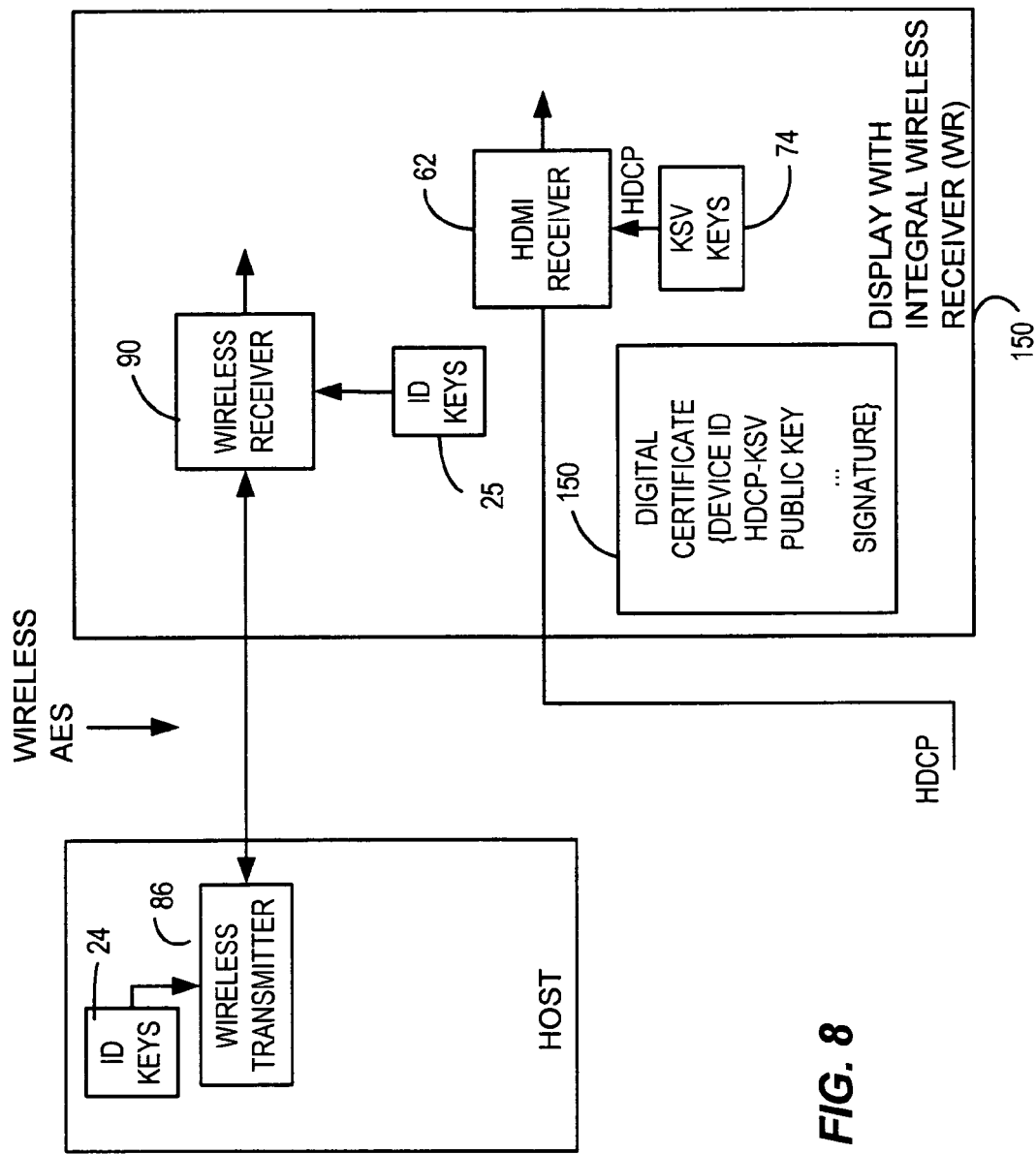
FIG. 8 is an exemplary integrated wireless repeater transmitter and integrated receiver integrated in the display consistent with certain embodiments of the present invention.

Referring now to FIGS. 6-8, several variants of the repeater circuit shown in FIG. 5 are depicted. In FIGS. 6 and 8, rather than a repeater, the wireless receiver (WR) is embedded within a display device directly. In FIGS. 7 and 8, the wireless transmitter (WT) is embedded in the host or content source device directly. In either case, without the use of certificates 150, the same vulnerability would exist as in the repeater of FIG. 2. And, while mating the WT with the WR could solve the security problem, it may have the aforementioned operational and usability issues.

Additionally, with the devices of FIGS. 6 and 8, the wireless communication is directly with a display device, which has internal wireless receiver capability. Thus, although not strictly a repeater device, the term wireless receiver (WR) can be used instead, with the understanding that it behaves in the same manner as though it were a repeater receiver. Hence the terms WR and WRR can be used somewhat interchangeably with WR being somewhat more properly generic. Similarly, the term wireless transmitter (WT) can be considered generic for and interchangeable with a WRT, where wireless transmitter 86 incorporated within the host device can be considered a WT. But, references throughout to a WT or WR, WRT or WRR should be considered broadly incorporating both true repeater devices as well as source and sink devices or any other devices operating in the manner described.

The various embedded scenarios depicted in FIGS. 6, 7 and 8 have the same security problems as the standalone scenario of FIG. 2, which can be remedied using the same digital certificate 150 and associated revocation technique as discussed. In the absence of certificate 150 and the associated technique, each would suffer from same lack of ability to properly verify the reported HDCP KSV value 42 (and/or 46 if there is another HDMI output). With embedded WT approaches of FIGS. 7 and 8, the WT 80 is built into the host 10. And so, the KSV will be checked against the revocation list directly instead of being forward to a separate host 10. In FIGS. 6 and 8, the WR 82 is embedded in the display 50. Therefore, in the absence of a certificate, there may not be any HDCP KSV to report at all and no way to revoke a compromised combination WR and display. As will be discussed later, a KSV key can be provided even in the absence of HDCP as a KSV key that can be used for revocation purposes.

Any system such as those mentioned above remains vulnerable to attack as long as a spoof device acting as a WR 82 can be produced that can entice a WT to transmit content over the wireless connection. FIG. 5 depicts an enhanced security wireless repeater arrangement that remedies the flaw found with proposed wireless repeaters. In this embodiment, a WT 180 utilizes a wireless link to WR 182 (which may form a part of a wireless display device in which content is consumed wirelessly rather than being repeated—shown in FIGS. 6 and 8).

In this arrangement, a digital certificate is utilized to tie the wireless receiver identity and keys 25 to a specific HDCP KSV and keys 42 and 46, to assure the security integrity of the signal path. In accord with this arrangement a digital certificate 150 (or multiple digital certificates) is created by using a combination of the HDCP device identity (the KSV for either or both or as many transmitters as are present) and an identity for the device itself (e.g., an identification number (ID) for the entire device, or any subsystem thereof) so that the HDCP 42 and 46 identity is tightly coupled to the WRR 82 device. The certificate can also include a public key, if used, for the WRR wireless receiver identity and keys 25, and a certificate signature. The public key can be used to establish a session key between the WT 86 and WR 90 that can be used to secure the wireless link. The associated private key is safeguarded and will ensure that a hacker cannot simply observe the transfer of the digital certificate from the WRR 182 to the WRT 180, and copy the certificate to create credentials for a spoof device 182. However, the public key could be transferred in a different certificate than from that linking the HDCP identities to the wireless identities. The certificates could be linked, e.g. using a common wireless identity 25 or serial number used with WRR 182.

In one embodiment, this can be accomplished by hashing or otherwise combining or binding one or more of the HDCP identities (KSV) 42 and 46 with a wireless repeater receiver identifier and placing this information in a digital certificate with a digital signature that can be transferred via the wireless link from WR 182 to WT 180. The WRT 80 then passes the correct KSV 42 and 46 to the host 10 for verification against a revocation list. Or, if the WT is embedded in the host, then it would check the KSV in the revocation list directly. In the future, an enhanced HDCP protocol might allow the passing of the WR wireless receiver identity to the source. If either or both of the identities (KSV or receiver identifier) are found to be compromised, e.g. manufactured into mass marketed hacking devices, they can be placed on the revocation list. If a spoof or fake WR 80 is detected and is on the revocation list, the spoof will fail and the content will remain secure.

By hashing these identities, or otherwise combining or binding them, an HDCP identity can be tightly coupled to the device itself, and is thereby readily managed using digital certificates. The KSV value reported will be real and tied to a real WR 82. In other embodiments, the certificate can contain information for other copy protection systems besides HDCP. For example, a DTCP identity (used on the 1394, USB, USB2 or IP interface) could be listed or other information that can be used to uniquely identify the WR for security purposes. If any of these other identities are found to be compromised and on any revocation list processed by the host 10, then copy protected content is not output HDMI.

Under this scenario, a certificate that makes sure the identity of the WR wireless receiver 90 is real and tightly linked a HDCP KSV identity. This provides for verification of the authenticity of the WR 82 and guards against a spoof device. The certificate is checked by the WT. The WT reports the correct HDCP KSV identity to the source. The source has the power to revoke a compromised HDCP KSV and not output content. Any suitable digital certificate management authority 190 can be used to manage the certificate since this security application is tied to HDCP. It is possible for a manufacture to obtain a manufacturer certificate from a root authority. The manufacturer may then be able to sign the WR certificates as a manufacturer certificate authority. Or the manufacturer could simply sign the WR certificates as a root certificate authority.

In the connections of FIGS. 6 and 8, the WR receiver identity is built into a television display device or television (TV). There is no corresponding HDMI transmitter 34 or 38, and KSVs associated with the content sent over the wireless path. In this scenario, there may be a HDCP KSV 75 associated with a different HDMI receiver 58 on the display 55. That KSV associated with the HDMI input can be associated with the certificate. Another possible solution is the association of a pseudo HDCP KSV with the display 55. The pseudo HDCP KSV does not have any associated HDMI receiver. The pseudo KSV will allow revocation by a host 10 but will not be used to transfer data in the display device by the embedded WRR function. Consequently, use of a pseudo KSV will not require any real HDCP keys. The pseudo KSV does need to be tracked by Digital Copy Protection LLC so that it could be placed in revocation list if need be. The pseudo KSV has the benefit of not being tied to a real HDMI circuit. So it might be possible, for example, to repair an HDMI circuit by replacing a board. The KSV would be different but since the pseudo KSV is not tied to a real circuit, no change would be required to the certificate. Another possible solution would create an internal HDMI connection inside the display 55, but such an approach would have the additional expense of extra hardware and possibly an internal HDMI cable.

Under both scenarios above, revocation of an embedded WR is closely tied to HDCP. In a preferred embodiment, the certificate would be constructed to contain a device address (e.g., 40 bits), an HDCP Key Selection Vector (KSV) (e.g., 40 bits), a wireless receiver public key (e.g., 1024-bit RSA which is approximately equal to an 80 bit symmetric key) and a Certificate Authority Signature (e.g., 2048-bit RSA which is approximately equal to 112-bit symmetric key). But, of course, other sizes could be used with longer bit strings providing better security. Alternatively, instead of RSA, Elliptic Curve public key cryptography may be used which might allow for shorter key lengths. For example, Elliptic Curve cryptography with a length of 160 bits is equal to 1024-bit RSA, and 224 bits to 2048-bit RSA. By tying the WR wireless identity to an HDCP KSV, the proper KSV can be reported to the source device, host 10 for checking against the revocation list. A breech of the wireless identity will cause a revocation through the HDCP KSV identity.

For purposes of this document, the term KSV key or HDCP key or HDCP KSV or the like is also intended to embrace and reference the above concept of a pseudo key, without regard for presence or absence of associated HDCP to the key. Such a pseudo key will be used, as disclosed above, for the same purposes—that is, to support use of a digital certificate that ties a KSV key to a specified element of hardware including repeater parts or displays, etc.

Additionally, with the devices of FIGS. 6 and 8, as noted above, the wireless communication is directly with a display device, which has internal wireless receiver capability. Thus, although not strictly a repeater device, the term wireless receiver (WR) can be used instead, with the understanding that it behaves in the same manner as though it were a repeater receiver. Hence the terms WR and WRR can be used somewhat interchangeably with WR being somewhat more properly generic. Similarly, the term wireless transmitter (WT) can be considered generic for and interchangeable with a WRT, where wireless transmitter 86 incorporated within the host device can be considered a WT. But, references throughout to a WT or WR, WRT or WRR should be considered broadly incorporating both true repeater devices as well as source and sink devices or any other devices operating in the manner described.

Figure 9:
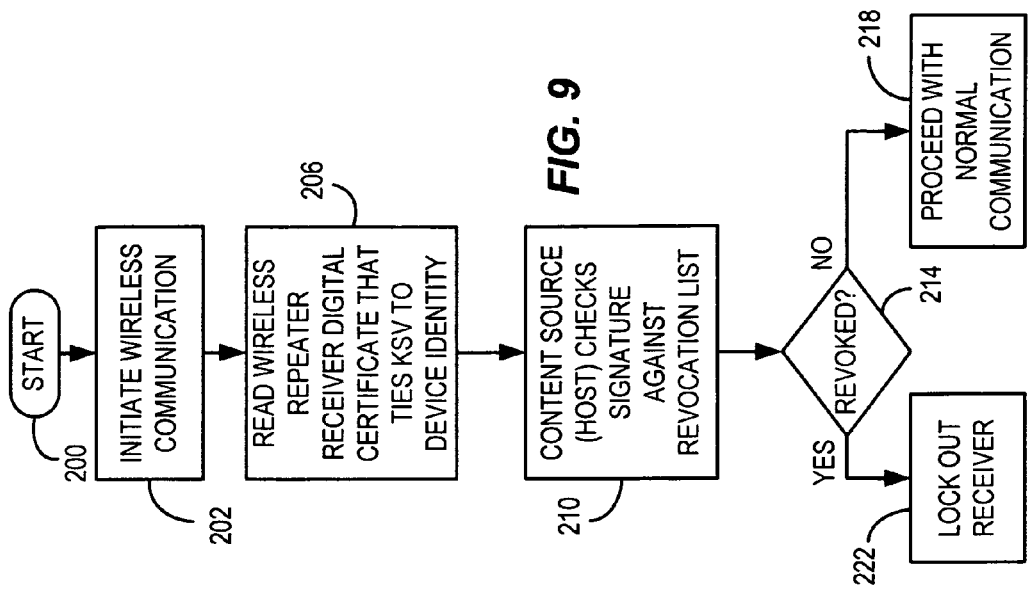
FIG. 9 is a flow chart of an exemplary communication process consistent with certain embodiments of the present invention.

A session authorization process is depicted at FIG. 9 starting at 200 wherein at 202 a wireless session is initiated. The digital certificate is read at 206 by the WT. For standalone WRT, the KSV is extracted passed along the signal path using HDCP protocols to the source device 10 at 206. Once the KSV is received at the host 10, the source checks the KSV against a revocation list provided by the digital certificate authority at 210. If the KSV has not been revoked at 214, normal communication can proceed at 218. If the KSV has been revoked at 214, the receiver device 182 (or spoof device) is locked out at 222. For embedded WRTs built into the host device such as is shown in FIGS. 7 and 8, the KSV can be extracted from the certificate and checked directly.

Therefore, in a mating process, the WR delivers its certificate to the WT. In some embodiments, the WT may have a certificate as well. The WT certificate may contain a public key used to create the session key. Certificate signatures are checked using the public key of the certificate authority. For example, the root CA could be the Digital Content Protection (DCP). Manufacturer certificates may be allowed. In which case, the WRT traverses a chain of trust to first verify the device certificate issued by the manufacturer and then to verify the root authority certificate of the manufacturer. The KSV value is checked against an HDCP revocation list by the content source, host 10 which can also check to see if the device identification has been revoked (if a revocation list exists) for example when WT is embedded in the host 10. A revocation of a KSV also revokes the wireless receiver identity. Thus, the validity of the wireless high definition interface (WHDI) depends on HDCP revocation.

In all embodiments, one copy protection system is linked to another which has the potential for revocation. A breach of the system without revocation will cause the identity of the scheme with revocation to be revoked because the identities for the different copy protection system are linked in a database held either by the manufacture or by the licensing authority. Thus, a certificate is used to link one copy protection system with another which has a revocation scheme. A number of different copy protection systems could be managed this way and not just two, wireless and HDCP, as depicted.

The certificate may be created real-time once it is known just which copy protection identity is being linked with another copy protection identify at the factory. As mentioned above, the manufacturer may be able to use a "manufacturer certificate" tied to the root certificate authority, e.g. in the case of HDCP this would DCP LLC. The manufacture would then be able to sign certificates for newly create devices with wireless receiver capability. The factory typically draws from a lot of identities when creating a new unit, e.g. MAC address, device serial number, copy protection device IDs, etc. In certain embodiments, it may be desirable to also create a more powerful "copy protection linkage" certificate signed by a neutral third party serving as a digital certificate authority.

Hence, in accord with certain embodiments, the manufacturer creates a digital certificate which will tie the wireless, e.g. WHDI, security to HDCP KSV values. The manufacturer is aware of the HDCP identity used in their wireless transmitter (WT) and wireless receiver (WR) products. A set-top box or other source might have many different links and there might be many different identities to check. In certain embodiments, the consumer entertainment (CE) manufacturer could communicate with a neutral certificate authority portal to get them to sign the certificate. This might provide a more neutral way to allow parties to validate devices. Other embodiments will occur to those skilled in the art upon consideration of the present teachings.

While the above techniques are described in terms of inserting a wireless repeater or other wireless link into a normally secure HDMI/HDCP wired connection, embodiments consistent with the present invention are generally applicable to other systems wherein an alternate transmission method is inserted into an original transmission system. Security is assured by using an existing certificate revocation system in which the digital certificate is created by binding a device identity to a security key, so that a device can be revoked in the event of an attempted spoof attack. In the above examples, the HDMI/HDCP wired connections are considered an original transmission method (OT), while the wireless arrangement is considered an alternate transmission (AT) method.

Thus, a method of managing revocation when an alternate transmission method, using an alternate transmitter identity and an alternate receiver identity, is juxtaposed into an original transmission system, the original transmission system having its own original transmitter and receiver identities which communicate using an original transmission method, involves: at the alternate transmission receiver (ATR), providing a digital certificate, the digital certificate binding the ATR identity to an original transmission (OT) re-transmitter identity; at the ATR, responsive to an initiation of a communication session from an alternate transmission transmitter (ATT), sending the digital certificate to the ATT using alternate the transmission method; at the ATT, extracting the original transmission identity from the certificate and sending it to the original transmission transmitter (OTT) using original transmission method for checking in a revocation list; then, if the OT identity is found to be in the revocation list, preventing copy protected content from being sent from the OTT.

In certain embodiments, the original transmission is one of: HDMI with High-Bandwidth Digital Copy Protection (HDCP), Digital Visual Interface (DVI) with HDCP, Internet Protocol (IP) with Digital Transmission with Copy Protection (DTCP), Universal Serial Bus (USB) with DTCP, IEEE1394 with DTCP. In certain embodiments, the alternate transmission is one of wireless, carried over coaxial cable, and carried over powerline cable. In certain embodiments, f the OT identity is not found on the revocation list, then permitting content to be sent from the OTT. In certain embodiments, the digital certificate includes the ATR identity hashed or otherwise combined with an original transmission (OT) re-transmitter identity.

In certain embodiments, an alternate transmission, with alternate transmitter and receiver identities, is partly juxtaposed on an original transmission system, with either an original transmitter and receiver identity involves at the alternate transmission receiver (ATR), providing a digital certificate, the digital certificate binding the ATR identity to an original transmission (OT) identity which can be used for revocation purposes; at the ATR, responsive to an initiation of a communication session from an alternate transmission transmitter (ATT), sending the digital certificate to the ATT using alternate transmission means; at the ATT, performing one of the following: directly checking to see if the OT identity or ATR identity is in a revocation list, extracting the original transmission identity from the certificate and sending it to an original transmission transmitter (OTT) using original transmission method for checking in a revocation list, sending the entire certificate to a controlling authority to check identities in a revocation list; then, if the OT identity or ATR identity is found to be in the revocation list, preventing content from being sent either from the ATT or OTT.

Thus, in accord with certain embodiments, a method of managing revocation when an alternate transmission method, using an alternate transmitter identity and an alternate receiver identity, is juxtaposed into an original transmission system, the original transmission system having its own original transmitter and receiver identities that communicate via an original transmission method involves at an alternate transmission receiver (ATR), providing a digital certificate, the digital certificate cryptographically binding the ATR identity to an original transmission (OT) re-transmitter identity; at the ATR, responsive to an initiation of a communication session from an alternate transmission transmitter (ATT), sending the digital certificate to the ATT using the alternate transmission method; at the ATT, extracting the original transmission identity from the certificate and sending it to the original transmission transmitter (OTT) using the original transmission method for checking in a revocation list; and if the OT identity is found to be in the revocation list, preventing copy protected content from being sent from the OTT.

In certain embodiments, the digital certificate also includes a public key or is linked to a public key that is provided in a different certificate and one of the following is performed: the ATT checks that the ATR has a corresponding private key to public key in the certificate before either sending the OT identity to the OTT for checking against the revocation list or passing copy protected content to the ATR, and uses the public key in the delivery or generation of the session key used to encrypt copy protected content from the ATT to ATR thereby ensuring that only an ATR with the corresponding private key will correctly receive the content.

In certain embodiments the original transmission method comprises at least one of: high definition multimedia interface (HDMI) with High-Bandwidth Digital Copy Protection (HDCP), Digital Visual Interface (DVI) with HDCP, Internet Protocol (IP) with Digital Transmission with Copy Protection (DTCP), Universal Serial Bus (USB) with, DTCP, IEEE 1394 with DTCP. In certain embodiments, the alternate transmission method comprises one of wireless communication, data carried over coaxial cable, and data carried over powerline cable. In certain embodiments, other original transmission identities besides the original re-transmitter identity connected downstream are also sent using alternate transmission means to the ATT and then through original transmission means to the OTT for checking in a revocation list.

In another method of managing revocation when an alternate transmission, with alternate transmitter and receiver identities that use an alternate transmission method, is partly juxtaposed on an original transmission system, with either one of an original transmitter and receiver identity that use an original transmission method, the method involves at an alternate transmission receiver (ATR), providing a digital certificate, the digital certificate cryptographically binding the ATR identity to an original transmission (OT) identity which can be used for revocation purposes; at the ATR, responsive to an initiation of a communication session from the alternate transmission transmitter (ATT), sending the digital certificate to the ATT using the alternate transmission method; at the ATT, performing one of the following: directly checking to see if the OT identity or ATR identity is in a revocation list, extracting the original transmission identity from the certificate and sending it to an original transmission transmitter (OTT) using the original transmission method for checking in a revocation list, sending the entire certificate to a controlling authority to check identities in a revocation list; and if the OT identity or ATR identity is found to be in the revocation list, preventing content from being sent either from the ATT or OTT.

In certain embodiments, the digital certificate also includes a public key or is linked to a public key that is provided in a different certificate, and one of the following is performed: the ATT checks that the ATR has a corresponding private key to public key in the certificate before either sending the OT identity to the OTT for checking against the revocation list or passing copy protected content to the ATR, and uses the public key in the delivery or generation of the session key used to encrypt copy protected content from the ATT to ATR thereby ensuring that only an ATR with the corresponding private key will correctly receive the content.

In certain embodiments, the original transmission method comprises at least one of: high definition multimedia interface (HDMI) with High-Bandwidth Digital Copy Protection (HDCP), Digital Visual Interface (DVI) with HDCP, Internet Protocol (IP) with Digital Transmission with Copy Protection (DTCP), Universal Serial Bus (USB) with DTCP, IEEE1394 with DTCP. In certain embodiments, the alternate transmission method comprises one of wireless communication, data carried over coaxial cable, and data carried over powerline cable. In certain embodiments, other original transmission identities besides the original re-transmitter identity connected downstream are also sent using alternate transmission means to the ATT and then through original transmission means to the OTT for checking in a revocation list.

In another method of carrying out an alternate transmission, the method involves an alternate transmission transmitter (ATT) device, receiving an alternate transmission of a digital certificate from an alternate transmission receiver (ATR), the digital certificate containing an original transmission identity suitable for revocation combined with a device identifier for the ATR, a device public key and a digital signature; the ATT receiving the digital certificate, extracting the original transmission identity suitable for revocation, and sending this to a source device using original transmission means for checking in a revocation list; if the original identity is found to be revoked, the source device preventing transmission of copy protected content using the original transmission.

In certain embodiments, the digital certificate also includes a public key or is linked to a public key that is provided in a different certificate, and one of the following is performed: the ATT checks that the ATR has a corresponding private key to public key in the certificate before either sending the OT identity to the OTT for checking against the revocation list or passing copy protected content to the ATR, and uses the public key in the delivery or generation of the session key used to encrypt copy protected content from the ATT to ATR thereby ensuring that only an ATR with the corresponding private key will correctly receive the content. In certain embodiments, the original transmission method comprises at least one of: high definition multimedia interface (HDMI) with High-Bandwidth Digital Copy Protection (HDCP), Digital Visual Interface (DVI) with HDCP, Internet Protocol (IP) with Digital Transmission with Copy Protection (DTCP), Universal Serial Bus (USB) with DTCP, IEEE1394 with DTCP. In certain embodiments, the alternate transmission method is one of wireless communication, data carried over coaxial cable, and data carried over powerline cable. In certain embodiments, other original transmission identities besides the original re-transmitter identity connected downstream are also sent using alternate transmission means to the ATT and then through original transmission means to the OTT for checking in a revocation list.

An alternate transmission receiver (ATR) according to certain embodiments for receiving copy protected content from an associated alternate transmission transmitter (ATT) using an alternate transmission system and then adapting it to an original transmission system has a storage device. A digital certificate is stored on the storage device and contains an identity for an alternate transmission system, an identity for an original transmission system, a digital signature cryptographically binding the identity for the alternate transmission system and the identity for the original transmission system; and a circuit for transmitting the digital certificate to the ATT using alternate transmission means for the purpose of authenticating the ATR and providing for revocation.

In certain embodiments, the digital certificate further comprises a public key used to explicitly or implicitly authenticate the alternate transmission identity at the ATT. In certain embodiments, the alternate transmission method comprises one of wireless communication, data carried over coaxial cable, and data carried over powerline cable. In certain embodiments, the digital certificate comprises the ATR identity hashed with an original transmission (OT) system component identity. In certain embodiments, the circuit for transmitting further comprises a wireless transmitter portion of a wireless repeater.

Another method of carrying out wireless video communication consistent with certain embodiments involves at a wireless receiver (WR) device, providing a digital certificate, the digital certificate containing a High-Bandwidth Digital Copy Protection (HDCP) Key Source Vector (KSV), a device identifier for the WR device, and a digital signature cryptographically binding the identifiers; at the WR, responsive to an initiation of a wireless communication session from a wireless transmitter (WT) device, sending the digital certificate to the WT device; the WT receiving the digital certificate and having the identities in the digital certificate checked against a revocation list; and if one of the WR device's identities has been revoked, halting the wireless communication session.

Another method of carrying out wireless video communication involves at a wireless receiver (WR) device, providing a digital certificate, the digital certificate containing a High-Bandwidth Digital Copy Protection (HDCP) Key Source Vector (KSV), a device identifier for the WR device, and a digital signature cryptographically binding the identifiers; at the WR, responsive to an initiation of a wireless communication session from a wireless transmitter (WT) device, sending the digital certificate to the WT device; the WT receiving the digital certificate and having the identities in the digital certificate checked against a revocation list; and if one of the WR device's identities has been revoked, halting the wireless communication session.

In certain embodiments, the WR comprises a part of a wireless repeater and wherein the WT also comprises a part of the wireless repeater. In certain embodiments, the KSV is hashed with the device identifier in the digital certificate.

Another method of carrying out wireless video communication involves at a wireless receiver (WR) device, providing a digital certificate, the digital certificate containing a High-Bandwidth Digital Copy Protection (HDCP) Key Source Vector (KSV), a device identifier for the WR device, and a digital signature cryptographically binding the identifiers; at the WR, responsive to an initiation of a wireless communication session from a wireless transmitter (WT) device, sending the digital certificate to the WT device; the WT receiving the digital certificate and having the identities in the digital certificate checked against a revocation list; and if one of the WR device's identities has been revoked, halting the wireless communication session.

In certain embodiments, the WR comprises a part of a wireless repeater and wherein the WT also comprises a part of the wireless repeater. In certain embodiments, the KSV is hashed with the device identifier in the digital certificate.

Another method of carrying out wireless video communication involves at a wireless transmitter (WT) device, receiving a wireless communication of a digital certificate from a wireless receiver (WR) device, the digital certificate containing a High-Bandwidth Digital Copy Protection (HDCP) Key Source Vector (KSV), a device identifier for the WR device, and a digital signature; the WT wirelessly receiving the digital certificate and having the digital certificate checked against a revocation list; and if the WR device's digital certificate has been revoked, halting the wireless communication session.

In certain embodiments, the WR comprises a part of a wireless repeater and wherein the WT also comprises a part of the wireless repeater. In certain embodiments, the KSV is hashed with the device identifier to create the signature in the digital certificate.

In certain embodiments, an electronic storage medium stores a digital certificate that binds a copy protection system without revocation to one with revocation to permit revocation when authenticated, having: a High-Bandwidth Digital Copy Protection (HDCP) Key Source Vector (KSV); a device identifier for the WR device; and a digital signature that cryptographically binds the KSV and the device identifier; whereby, the digital certificate can be read and the KSV extracted and sent to a host device to be verified by comparison to a revocation list to verify the validity of the WR device.

In certain embodiments, a public key is also bound to the KSV and the device identifier. In certain embodiments, the KSV is hashed with the device identifier to create the signature in the digital certificate. In certain embodiments, the electronic storage medium is situated in a wireless receiver (WR). In certain embodiments, the WR comprises a part of a wireless repeater.

While certain embodiments herein were described in conjunction with specific circuitry that carries out the functions described, other embodiments are contemplated in which the circuit functions are carried out using an equivalent programmed processor to carry out the functions described or portions thereof. General purpose computers, microprocessor based computers, micro-controllers, optical computers, analog computers, dedicated processors, application specific circuits and/or dedicated hard wired logic, analog circuitry, pluralities of such devices and combinations of such devices in centralized or distributed configurations may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A method of carrying out wireless video communication, comprising:
  at a wireless receiver (WR) device:
    providing a digital certificate, the digital certificate comprising a High-Bandwidth Digital Copy Protection (HDCP) Key Source Vector (KSV), a device identifier for the WR device, a cryptographic key of the WR device, and a digital signature that cryptographically binds the HDCP KSV, the device identifier, and the cryptographic key of the WR device;

sending, responsive to an initiation of a wireless communication session from a wireless transmitter (WT) device, the digital certificate to the WR device, where the WT device individually checks the HDCP KSV, the device identifier, the cryptographic key of the WR device, and the digital signature of the digital certificate against a revocation list; and determining that the wireless communication session has been halted if any of the HDCP KSV, the device identifier, the cryptographic key of the WR device, and the digital signature has been determined by the WT device to have been revoked.

2. The method according to claim 1, further comprising creating the digital signature of the digital certificate by hashing the HDCP KSV with the device identifier and the cryptographic key of the WR device.

3. A method of carrying out wireless video communication, comprising:

at a wireless transmitter (WT) device:
initiating a wireless communication session with a wireless receiver (WR) device;
receiving, responsive to the initiation of the wireless communication session with the WR device, a digital certificate to the WR device, where the digital certificate comprises a High-Bandwidth Digital Copy Protection (HDCP) Key Source Vector (KSV), a device identifier for the WR device, a cryptographic key of the WR device, and a digital signature that cryptographically binds the HDCP KSV, the device identifier, and the cryptographic key of the WR device;
individually checking the HDCP KSV, the device identifier, the cryptographic key of the WR device, and the digital signature of the digital certificate against a revocation list; and
halting the wireless communication session if any of the HDCP KSV, the device identifier, the cryptographic key of the WR device, and the digital signature has been revoked.

4. The method according to claim 3, where the digital signature of the digital certificate comprises the HDCP KSV hashed with the device identifier and the cryptographic key of the WR device.

5. A method of carrying out wireless video communication, comprising:

at a wireless transmitter (WT) device:
receiving a wireless communication of a digital certificate from a wireless receiver (WR) device, the digital certificate comprising a High-Bandwidth Digital Copy Protection (HDCP) Key Source Vector (KSV), a device identifier for the WR device, a cryptographic key of the WR device, and a digital signature;
checking the received digital certificate against a revocation list; and
halting the wireless communication session if any of the HDCP KSV, the device identifier, the cryptographic key of the WR device, and the digital signature of the WR device's digital certificate has been revoked.

6. The method according to claim 5, where the digital signature of the digital certificate comprises the HDCP KSV hashed with the device identifier and the cryptographic key of the WR device.

7. A non-transitory electronic storage medium storing a digital certificate that binds a copy protection system without revocation to one with revocation to permit revocation when authenticated, the digital certificate comprising:

a High-Bandwidth Digital Copy Protection (HDCP) Key Source Vector (KSV);
a device identifier for a wireless (WR) device;
a cryptographic key of the WR device; and
a digital signature that cryptographically binds the HDCP KSV, the device identifier, and the cryptographic key of the WR device;
where, the digital certificate can be read from the non-transitory electronic storage medium, and the HDCP KSV and the cryptographic key of the WR device are extracted from the digital certificate and sent to a host device to be verified by comparison to a revocation list to verify validity of the WR device.

8. The non-transitory electronic storage medium according to claim 7, where the digital signature of the digital comprises the HDCP KSV hashed with the device identifier and the cryptographic key of the WR device.

9. The non-transitory electronic storage medium according to claim 7, wherein the non-transitory electronic storage medium is situated in the wireless receiver (WR) device.

10. The non-transitory electronic storage medium according to claim 7, wherein the WR device comprises a part of a wireless speaker.

11. A wireless receiver (WR) device, comprising:

a wireless receiver/transmitter device configured to receive video content and send information for verification of the WR device against a revocation list;
an electronic storage medium;
a digital certificate stored on the electronic storage medium comprising:
a segment of code representing a High-Bandwidth Digital Copy Protection (HDCP) key source vector (KSV);
a device identifier for the wireless receiver device;
a cryptographic key of the WR device; and
a digital signature that cryptographically binds the KSV, the cryptographic key of the WR device, and the device identifier; and
where the WR device wirelessly sends the digital certificate via the wireless receiver/transmitter device to a host device to be verified by comparison of the HDCP KSV, the device identifier, the cryptographic key of the WR device, and the digital signature to the revocation list to verify validity of the WR device.

12. The wireless receiver device according to claim 11, where the wireless receiver device creates the digital signature of the digital certificate by hashing the HDCP KSV with the device identifier and the cryptographic key of the WR device.

13. The wireless receiver device according to claim 11, wherein the WR device comprises a part of a wireless repeater.

* * * * *